US012540030B2

(12) United States Patent
Rimsa

(10) Patent No.: US 12,540,030 B2
(45) Date of Patent: Feb. 3, 2026

(54) CONTAINER WASHER LIFTER FOR REAR LOAD VEHICLE

(71) Applicant: Perkins Manufacturing Co., Bolingbrook, IL (US)

(72) Inventor: James Rimsa, Shorewood, IL (US)

(73) Assignee: Perkins Manufacturing Co., Bolingbrook, IL (US)

( * ) Notice: Subject to any disclaimer, the term of this patent is extended or adjusted under 35 U.S.C. 154(b) by 283 days.

(21) Appl. No.: 18/516,282

(22) Filed: Nov. 21, 2023

(65) Prior Publication Data

US 2025/0162796 A1 May 22, 2025

(51) Int. Cl.
*B65F 7/00* (2006.01)
*B65F 3/04* (2006.01)
*B65F 3/02* (2006.01)

(52) U.S. Cl.
CPC .............. *B65F 7/005* (2013.01); *B65F 3/041* (2013.01); *B65F 2003/024* (2013.01); *B65F 2003/0246* (2013.01)

(58) Field of Classification Search
CPC .. B65F 3/041; B65F 7/005; B65F 2003/0246; B65F 2003/024
See application file for complete search history.

(56) References Cited

U.S. PATENT DOCUMENTS 2,271,444 A * 1/1942 Schutz ...................... B65F 3/08 220/213
2,798,624 A * 7/1957 Brown .................... B65F 3/205 414/525.5
2,888,158 A * 5/1959 Wood ...................... B65F 3/205 414/525.5
3,032,216 A * 5/1962 Mccarthy ................ B65F 1/122 414/415
3,249,243 A * 5/1966 Herpich .................. B65F 3/207 414/525.52
3,291,144 A 12/1966 Diamond
3,372,875 A 3/1968 Torrey
3,604,577 A 9/1971 Heilmeier
3,765,555 A * 10/1973 McKenzie ................ B65F 3/02 403/210
3,881,950 A 5/1975 Pettit
4,673,327 A * 6/1987 Knapp .................... B65F 1/122 414/408

(Continued)

FOREIGN PATENT DOCUMENTS

AT 401505 B * 9/1996 .............. B65F 7/005
EP 0137416 A2 4/1985

(Continued)

*Primary Examiner* — Benjamin L Osterhout
(74) *Attorney, Agent, or Firm* — Cook Alex Ltd.

(57) ABSTRACT

A container washer lifter for a rear load vehicle is provided that includes a base having a cross member having first and second ends; and a commercial refuse collection container lifter connected to the cross member and comprising a cross bar assembly movable between an upright first position rearward of and below the cross member and an inverted second position above the cross member, with the cross bar assembly further comprising first and second trunnion bar lock assemblies that selectively retain a trunnion bar of a commercial refuse collection container. The lifter optionally also includes a residential refuse collection container lifter.

25 Claims, 21 Drawing Sheets

(56) References Cited

U.S. PATENT DOCUMENTS

| | | | | |
|---|---|---|---|---|
| 4,687,405 | A | 8/1987 | Olney | |
| 4,694,846 | A | 9/1987 | Bouchard | |
| 5,720,588 | A * | 2/1998 | Graves | B65F 3/02 414/421 |
| 5,807,056 | A * | 9/1998 | Osborn | B65F 3/06 414/420 |
| 6,224,317 | B1 | 5/2001 | Kann et al. | |
| 6,413,031 | B1 * | 7/2002 | Yakley | B65F 3/02 414/408 |
| 6,709,220 | B2 * | 3/2004 | Yakley | B65F 3/02 414/408 |
| 6,988,864 | B2 * | 1/2006 | Arrez | B65F 3/041 414/406 |
| 7,273,340 | B2 * | 9/2007 | Arrez | B65F 3/041 414/421 |
| 7,806,645 | B2 | 10/2010 | Arrez et al. | |
| 9,561,904 | B1 * | 2/2017 | Osborn | B65F 3/041 |
| 10,661,317 | B1 | 5/2020 | Conway | |
| 10,864,561 | B2 | 12/2020 | Conway | |
| 10,926,949 | B2 | 2/2021 | Conway | |
| 11,358,792 | B2 | 6/2022 | Rimsa | |
| 11,414,267 | B2 | 8/2022 | Rocholl | |
| 12,441,539 | B2 * | 10/2025 | Rimsa | B65F 3/02 |
| 2001/0046430 | A1 | 11/2001 | Bayne | |
| 2002/0071748 | A1 * | 6/2002 | Arrez | B65F 3/046 414/408 |
| 2002/0119034 | A1 * | 8/2002 | Arrez | B65F 3/046 414/408 |
| 2002/0141854 | A1 * | 10/2002 | Arrez | B65F 3/046 414/408 |
| 2002/0141855 | A1 * | 10/2002 | Arrez | B65F 3/041 414/408 |
| 2003/0002965 | A1 * | 1/2003 | Yakley | B65F 3/02 414/408 |
| 2005/0169734 | A1 * | 8/2005 | Arrez | B65F 3/041 414/406 |
| 2008/0089764 | A1 | 4/2008 | Vistro | |
| 2008/0110476 | A1 | 5/2008 | Amestoy | |
| 2008/0289665 | A1 | 11/2008 | Dwyer | |
| 2010/0170537 | A1 | 7/2010 | Gingras | |
| 2012/0125364 | A1 | 5/2012 | Wiley et al. | |
| 2013/0287541 | A1 * | 10/2013 | Smith | B65F 3/02 414/810 |
| 2014/0144470 | A1 | 5/2014 | Sewell | |
| 2021/0008608 | A1 | 1/2021 | Conway | |

FOREIGN PATENT DOCUMENTS

| | | | | |
|---|---|---|---|---|
| WO | WO-0142127 | A1 * | 6/2001 | B65F 3/046 |
| WO | WO-2023073230 | A1 * | 5/2023 | B65F 3/041 |

* cited by examiner

CONTAINER WASHER LIFTER FOR REAR LOAD VEHICLE

BACKGROUND

Field of the Disclosure

The present disclosure relates to equipment for lifting refuse collection containers to be washed. More particularly, the present disclosure relates to container washer lifters for rear load vehicles that lift, invert for washing and return to the ground refuse containers of multiple configurations.

Description of Related Art

Systems and methods for cleaning refuse collection containers are known in which spray nozzles are combined with a refuse collection container lifter, which may be more generally referred to as a container washer lifter. Typically, the container washer lifter inverts a refuse collection container to a position where spray nozzles are aimed at the inside of the container. After the inside of the container is washed by the spray nozzles, the container washer lifter returns the container to its original, upright position. See, e.g., U.S. Pat. Nos. 11,358,792, 6,554,008, 3,291,144 and EP 0 137 416, which are incorporated herein by reference.

SUMMARY

By way of the present application, a container washer lifter for connection to the rear of a trailer or other vehicle structure, referred to herein collectively as "a rear load vehicle", is provided that can be used for washing large, commercial refuse collection containers, such as those meeting ANSI Type T specifications, and optionally may be equipped to also be used for washing relatively smaller residential refuse collection containers.

In a first aspect, the present application discloses a container washer lifter for a rear load vehicle that comprises a base having a cross member having first and second ends; and a commercial refuse collection container lifter connected to the cross member and comprising a cross bar assembly movable between an upright first position rearward of and below the cross member and an inverted second position above the cross member, with the cross bar assembly further comprising first and second trunnion bar lock assemblies that selectively retain a trunnion bar of a commercial refuse collection container.

In a second aspect, the container washer lifter for a rear load vehicle optionally may further comprise a residential refuse collection container lifter connected to the cross member between the first and second ends of the cross member and comprising a residential refuse collection container holding assembly movable between an upright first position below the cross member and an inverted second position above the cross member, with the holding assembly further comprising at least one hook assembly that selectively retains at least one handle of a residential refuse collection container.

The container washer lifter is configured for use with a rear load vehicle. The disclosure includes that such vehicles will be equipped to pick up commercial residential refuse containers, such as ANSI Type T containers, as opposed to ANSI Type S containers that typically are picked up by front load vehicles.

The disclosure and its optional residential refuse collection container lifter advantageously may be configured to permit simultaneous lifting and inversion of two residential refuse collection containers. This facilitates higher productivity when seeking to provide container cleaning services for residential collection routes.

The residential refuse collection container lifter also includes length adjustable drive arms and follower arms, which allow for adjustment to adapt to different chassis heights of various rear load vehicles.

Also, a circuit is disclosed which may help guard against operator error by preventing operation of the commercial refuse collection container lifter when the lock assemblies are not engaged with a trunnion bar of a commercial refuse collection container. Similarly, a circuit may be utilized to prevent operation of the residential refuse collection container lifter when the commercial refuse collection container lifter is not in the raised position, so as not to obstruct movement of the residential refuse collection container lifter.

DETAILED DESCRIPTION

In accordance with the present disclosure, a container washer lifter is provided that is mountable to the rear of a vehicle. In this context, rear load vehicle may refer to a trailer or a vehicle having the ability to be driven. The lifter is suited for use with commercial-sized refuse collection containers having a trunnion bar, such as containers meeting ANSI Type T specifications, and optionally may additionally be suited for use with residential sized containers, typically in the form of refuse collection carts that are 35-96 gallons in size. Thus, the lifter may be configured to service only commercial routes or a combination of commercial and residential routes.

A container washer lifter 10 is provided and is mountable to the rear of a vehicle. The overall structure of lifter 10 will be described with reference to two examples, which are shown in FIGS. 1-11 and in FIG. 12. The example shown in FIGS. 1-11 includes both a commercial refuse collection container lifter and a residential refuse collection container lifter, while the example shown in FIG. 12 includes the commercial refuse collection container lifter.

Figure 8:
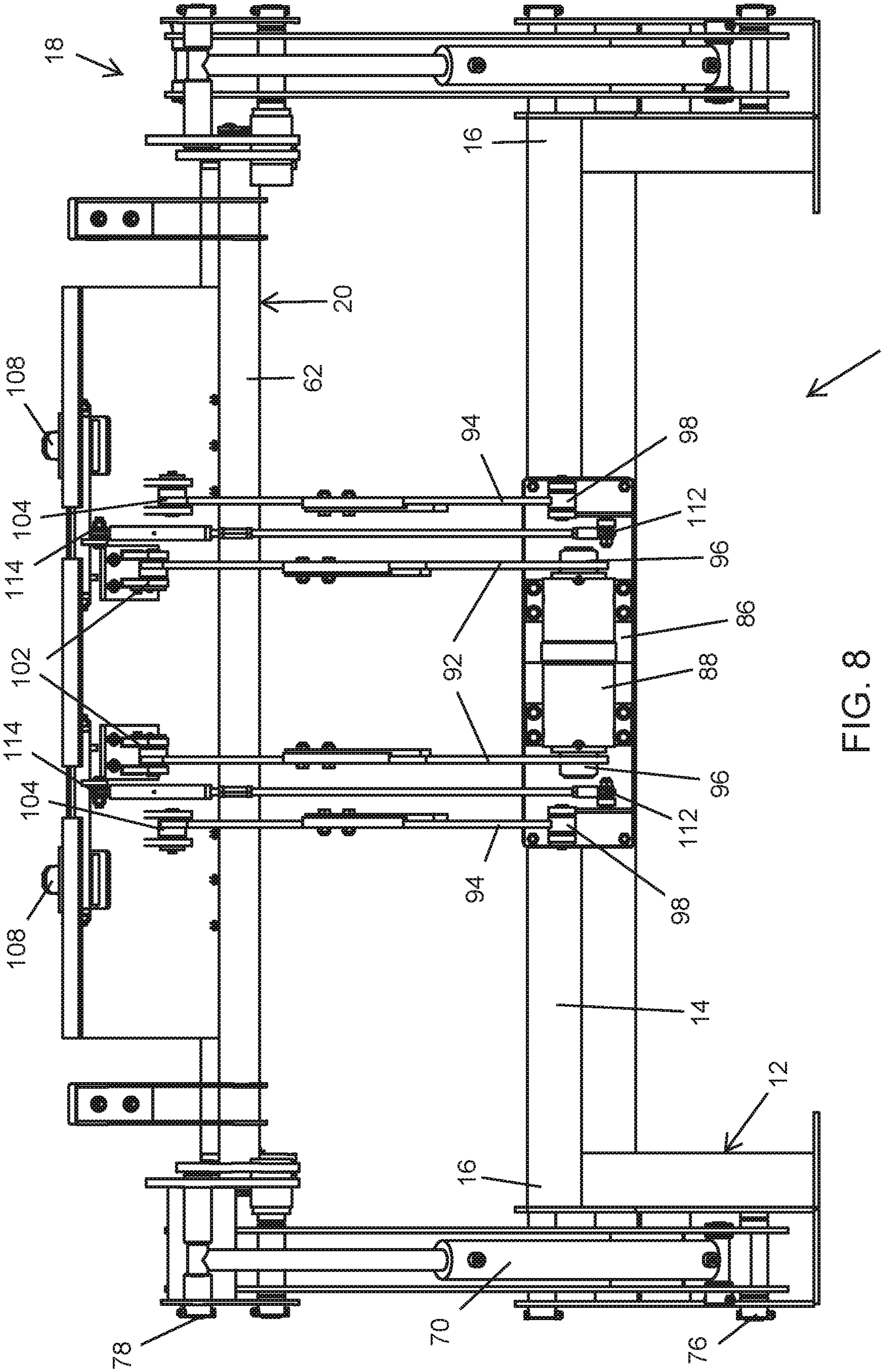
FIG. 8 is a front view of the lifter in the position shown in FIG. 7.
Figure 9:
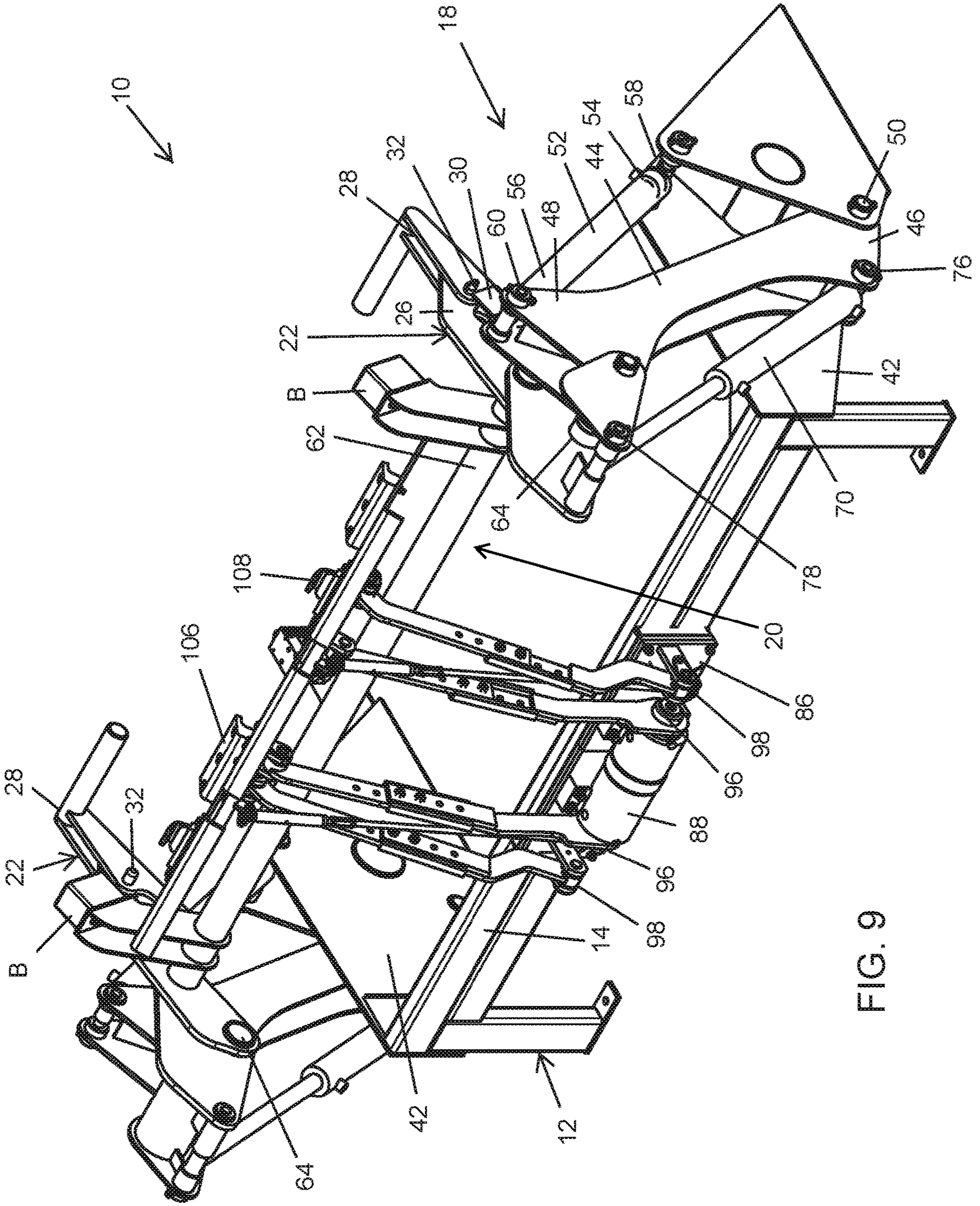
FIG. 9 is a perspective view of the lifter in the position shown in FIG. 7.
Figure 10:
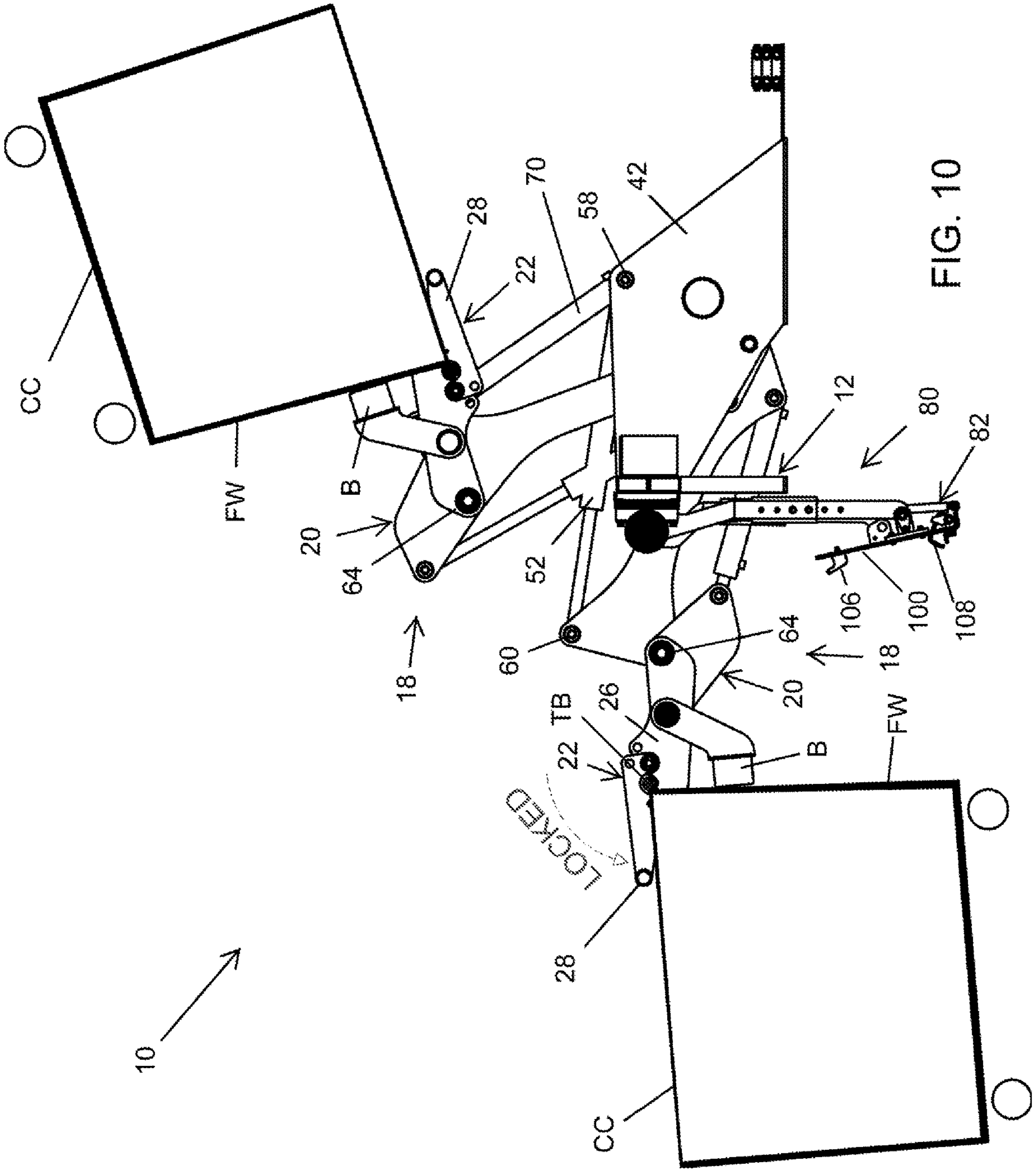
FIG. 10 is a cross sectional side view of the lifter of FIG. 1 with the near portion of the container washer lifter removed and showing the lifter in a lower position to pick up a commercial refuse container, as well as in a raised position to invert the commercial refuse collection container for washing.
Figure 11:
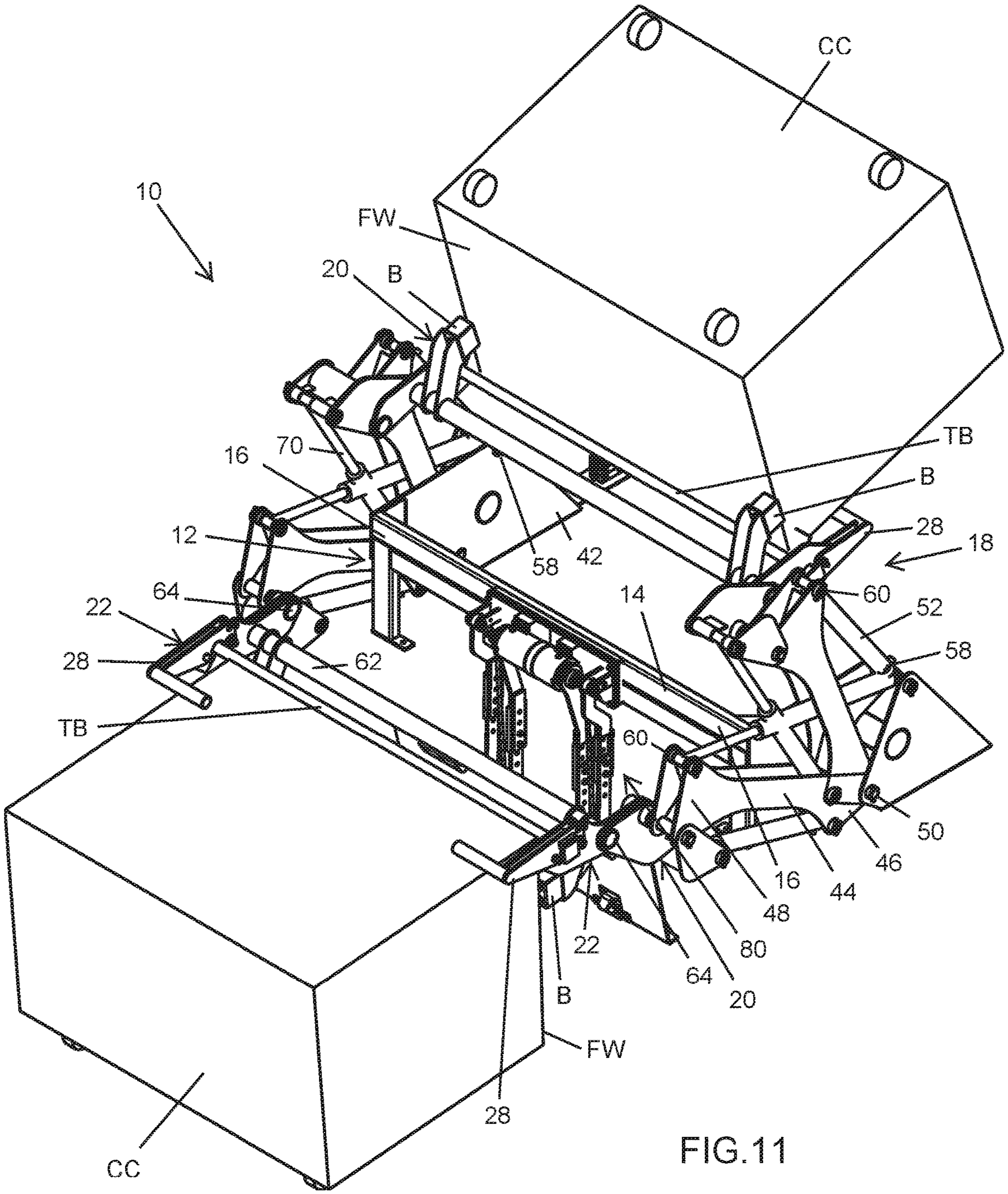
FIG. 11 is a perspective view of the lifter and commercial refuse container in the positions shown in FIG. 10.
Figure 12:
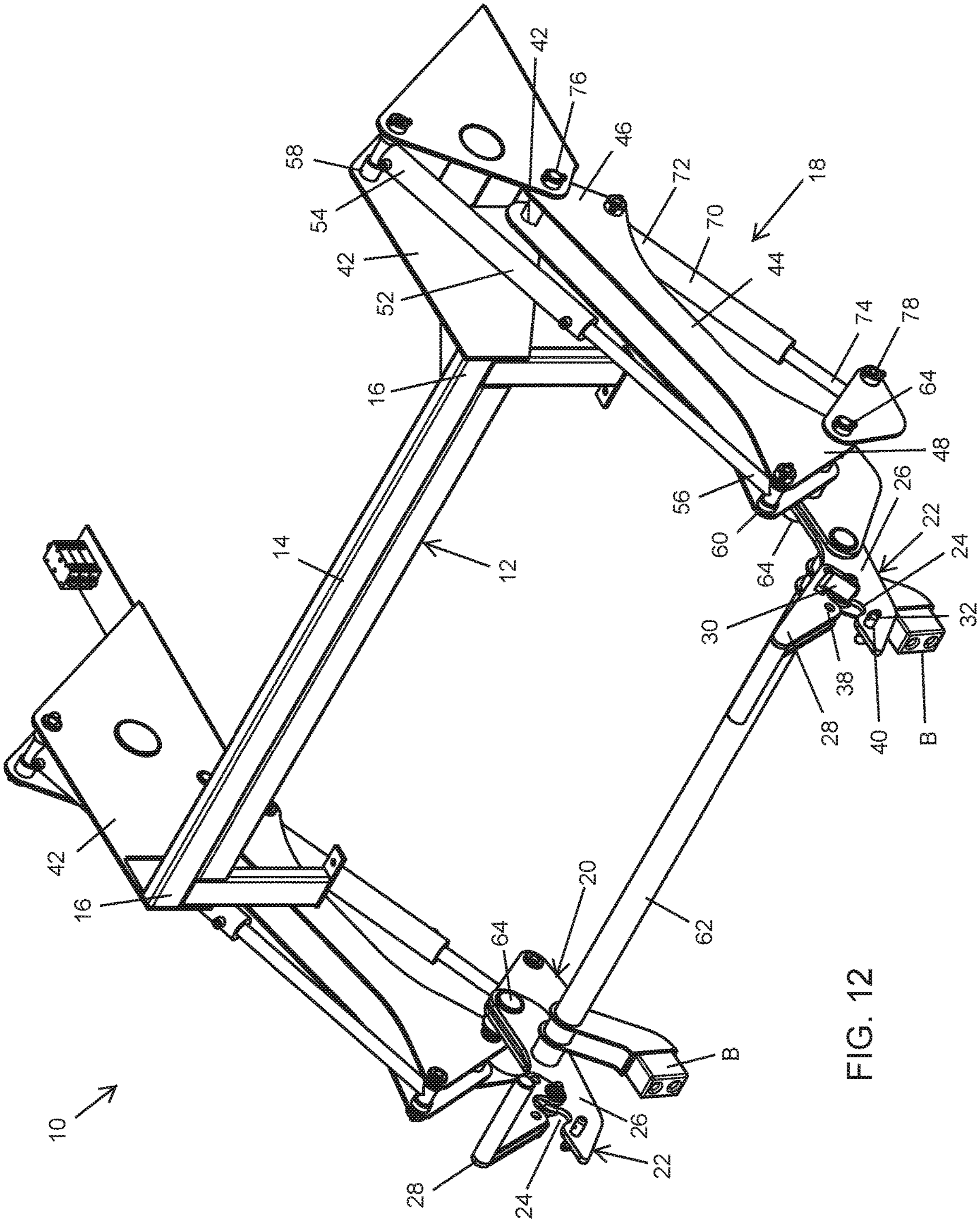
FIG. 12 is a perspective view of a container washer lifter for a rear load vehicle, configured for lifting a commercial refuse collection container, and without the optional residential refuse collection container lifter.

The container washer lifter 10 in FIGS. 1-11 and in FIG. 12 includes a frame or base 12 mountable to a rear load vehicle. The base 12 includes a cross member 14, which has first and second ends 16. In both examples, the container washer lifter 10 includes a commercial refuse collection container lifter 18 connected to the cross member 14. The commercial refuse collection container lifter 18 includes a cross bar assembly 20 movable between an upright first position rearward of and below the cross member 14, shown in FIGS. 1-3 and 12, and an inverted second position above the cross member 14, shown in FIGS. 7-9. The first and second positions are shown in FIGS. 10-11, with a commercial refuse collection container CC in the first and second positions. The cross bar assembly 20 further includes first and second trunnion bar lock assemblies 22 fixedly secured to the respective ends of the cross bar assembly 20. The trunnion bar lock assemblies 22 selectively retain a trunnion bar TB, located at the top of the front wall FW of the commercial refuse collection container CC. The trunnion bar lock assemblies 22 are spaced apart to engage the opposed ends of the trunnion bar TB.

Each of the first and second trunnion bar lock assemblies 22 of the container washer lifter 10 has an open position, shown in FIGS. 1-3, 12 and 14A, to receive or release a trunnion bar TB, and a closed or locked position, shown in FIGS. 7-9, 13 and 14B, to retain the trunnion bar TB. In the examples shown, each trunnion bar lock assembly 22 has a trunnion bar recess 24 that receives an end of the trunnion bar TB. The trunnion bar recess 24 is in an upper edge of a rearward extending plate 26. Each trunnion bar lock assembly 22 also includes a lockdown bar 28 that selectively captures and connects the trunnion bar TB to the trunnion bar lock assembly 22. Each lockdown bar 28 is pivotally movable relative to the recess 24, but being pivotally connected to the respective rearward extending plate 26. The trunnion bar lock assemblies 22 retain the trunnion bar TB, while a pads or bumpers B engage the front wall FW of the commercial refuse collection container CC.

Each trunnion bar lock assembly 22 may further include a lateral lock plate 30, which blocks outward lateral movement of a respective end of the trunnion bar TB when the trunnion bar TB is received by the trunnion bar lock assembly 22 and the lockdown bar 28 is moved to the locked position. Thus, the respective lateral lock plates 30 together block side-to-side or lateral movement of the trunnion bar TB. This keeps the commercial refuse collection container CC positively located and centered relative to the trunnion bar lock assembly 22, assuring more controlled movement of the commercial refuse collection container CC during operation of the commercial refuse collection container lifter 18.

Figure 13:
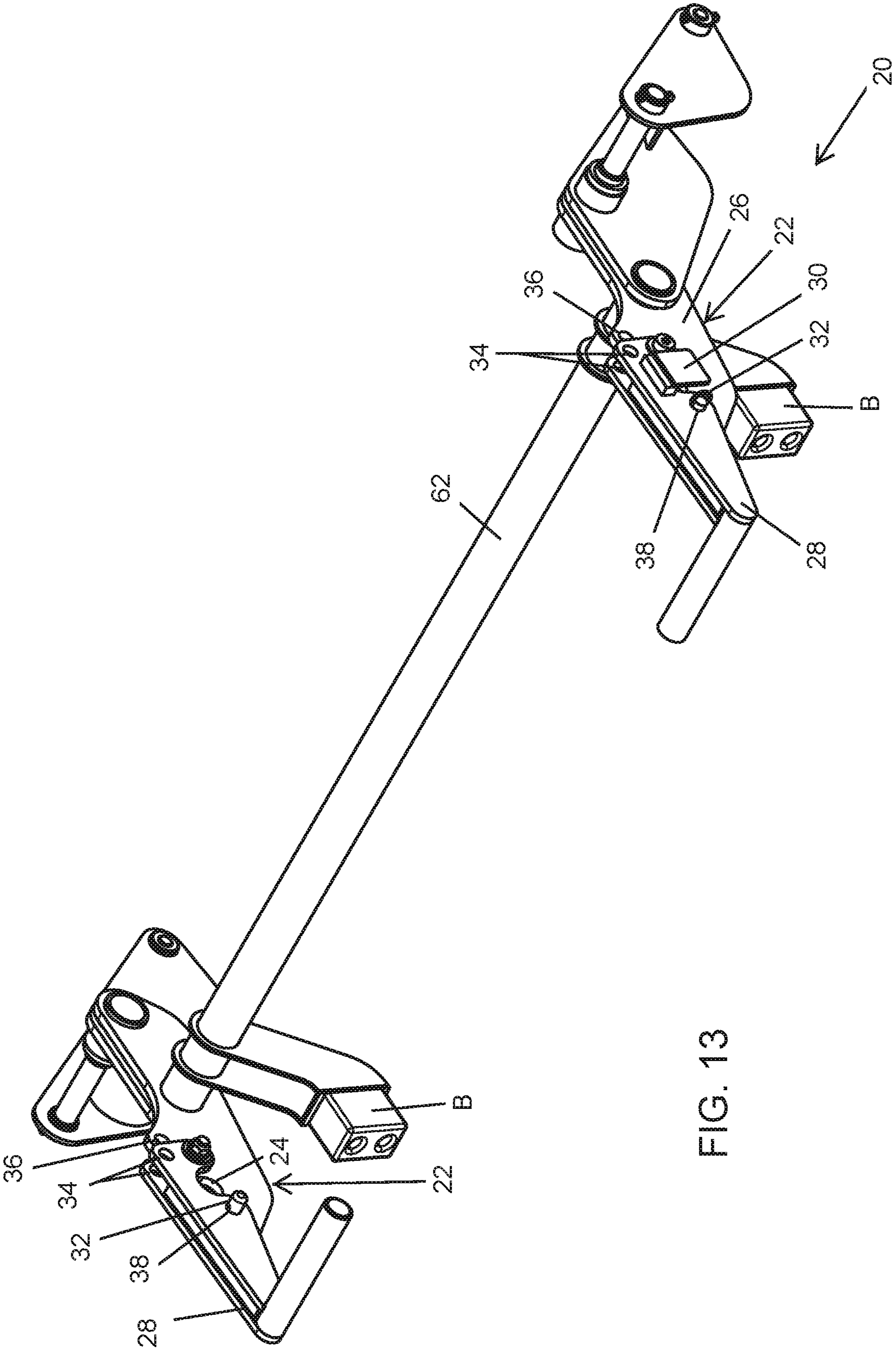
FIG. 13 is a perspective view of featuring the cross bar assembly and trunnion bar lock assemblies shown in FIG. 12.
Figure 14A:
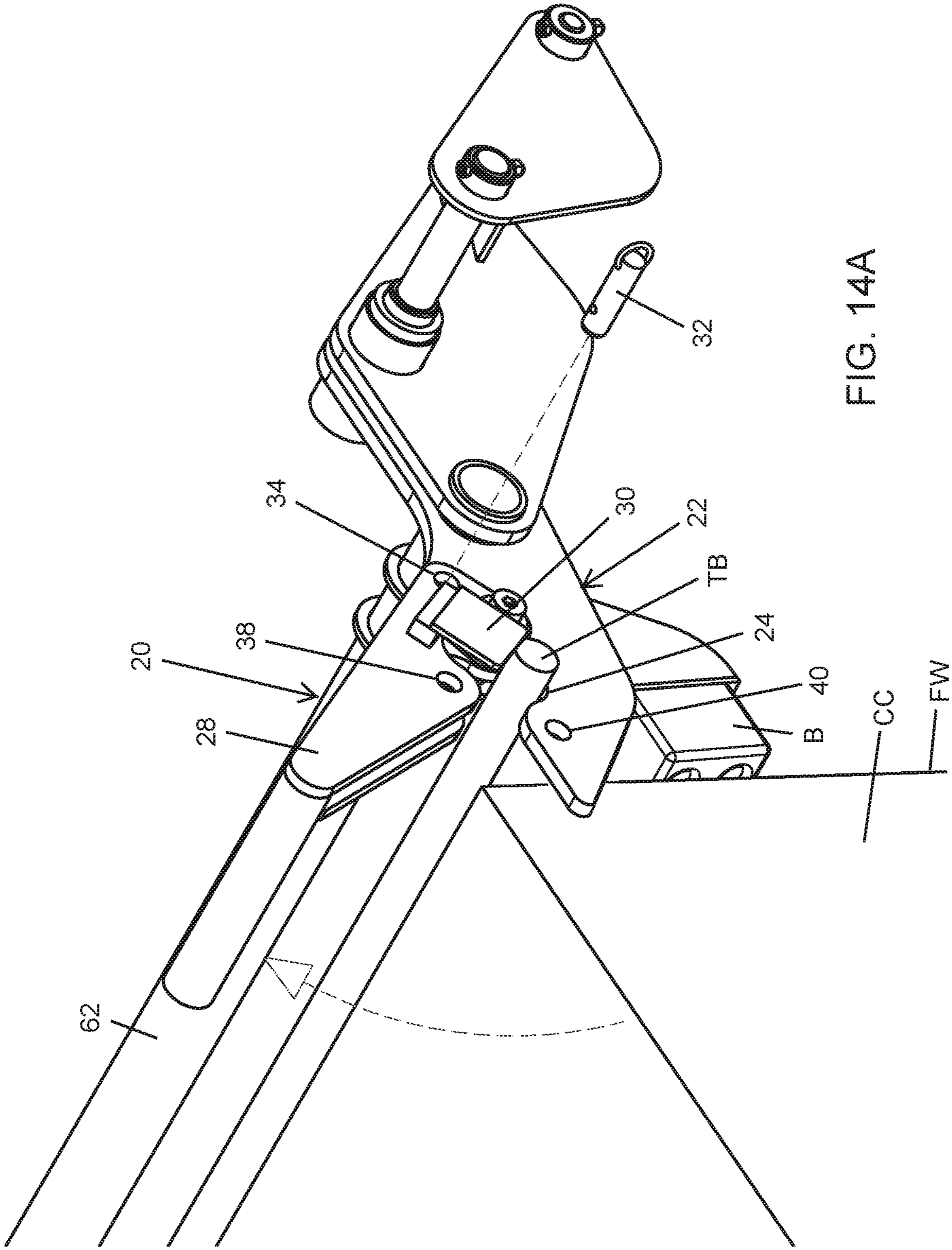
FIG. 14A is an enlarged perspective partially exploded view of one end of the cross bar assembly shown in FIG. 13, with the manually manipulated lock pin removed, the trunnion bar lock assembly in an open position and a trunnion bar of a commercial refuse collection container received in the trunnion bar lock assembly.
Figure 14B:
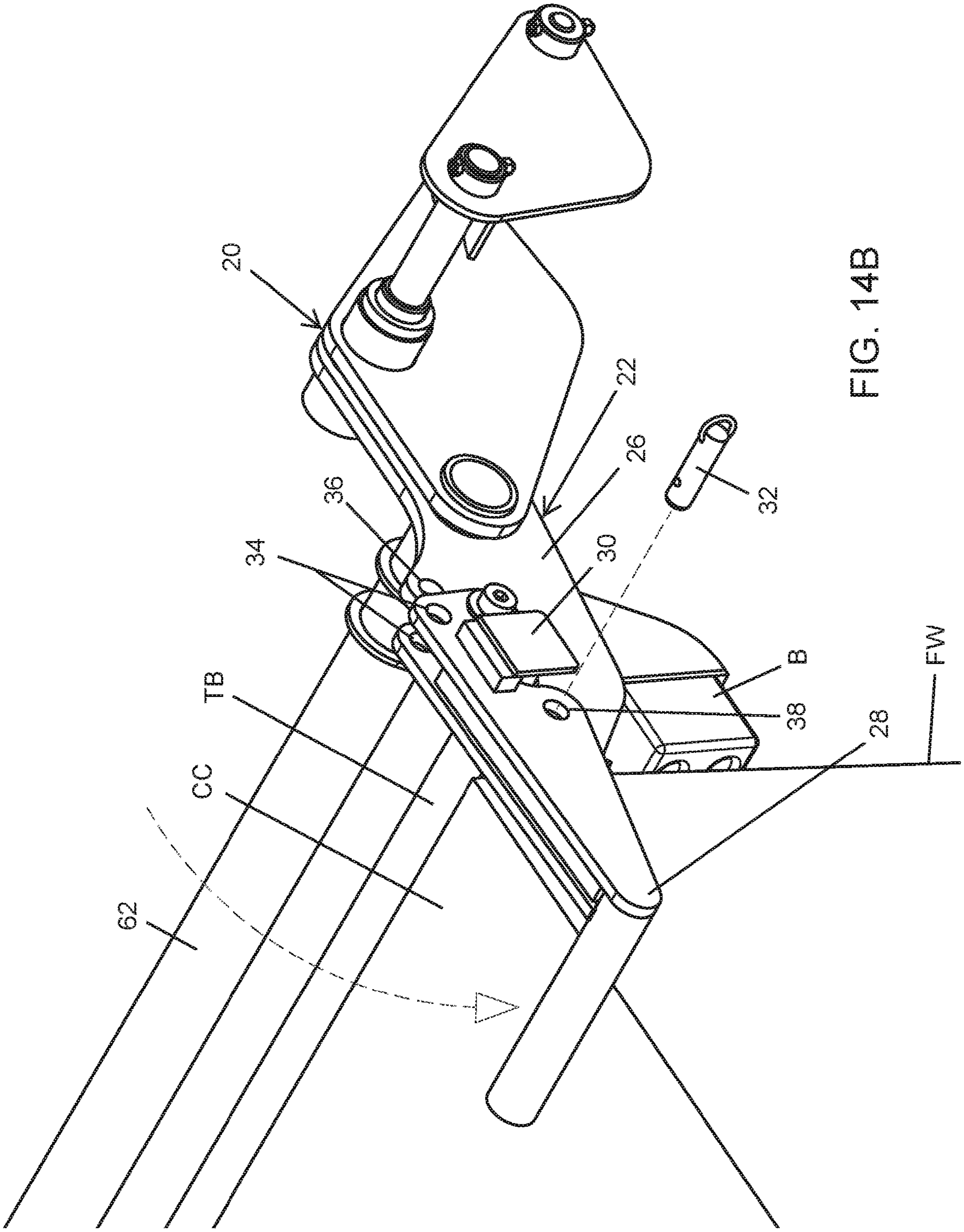
FIG. 14B is an enlarged perspective partially exploded view of the end of the cross bar assembly and trunnion bar shown in FIG. 14A, with the trunnion bar lock assembly moved to a closed position and the lock pin aligned for insertion.

Each of the first and second trunnion bar lock assemblies 22 also may include apparatus to hold the lockdown bar 28 in the open position or in the locked position, as best seen in FIGS. 13 and 14A-14B. For example, as best seen in FIG. 14A, each trunnion bar lock assembly 22 may include a push pin 32 for holding a lockdown bar 28 in the open position by insertion of the push pin 32 into the apertures 34 of the lockdown bar 28 and aperture 36 of the respective trunnion bar lock assembly 22, in the rearward extending plate 26. As seen in FIGS. 13 and 14B, each push pin 32 also may be used for holding a lockdown bar 28 in the closed position by insertion of the push pin 32 into the apertures 38 of the lockdown bar 28 and aperture 40 of the respective trunnion bar lock assembly 22, in the rearward extending plate 26. The push pin 32 may be manually removed or inserted by an operator, as needed when the lockdown bar 28 is located in a desired respective open or closed position.

Figure 15A:
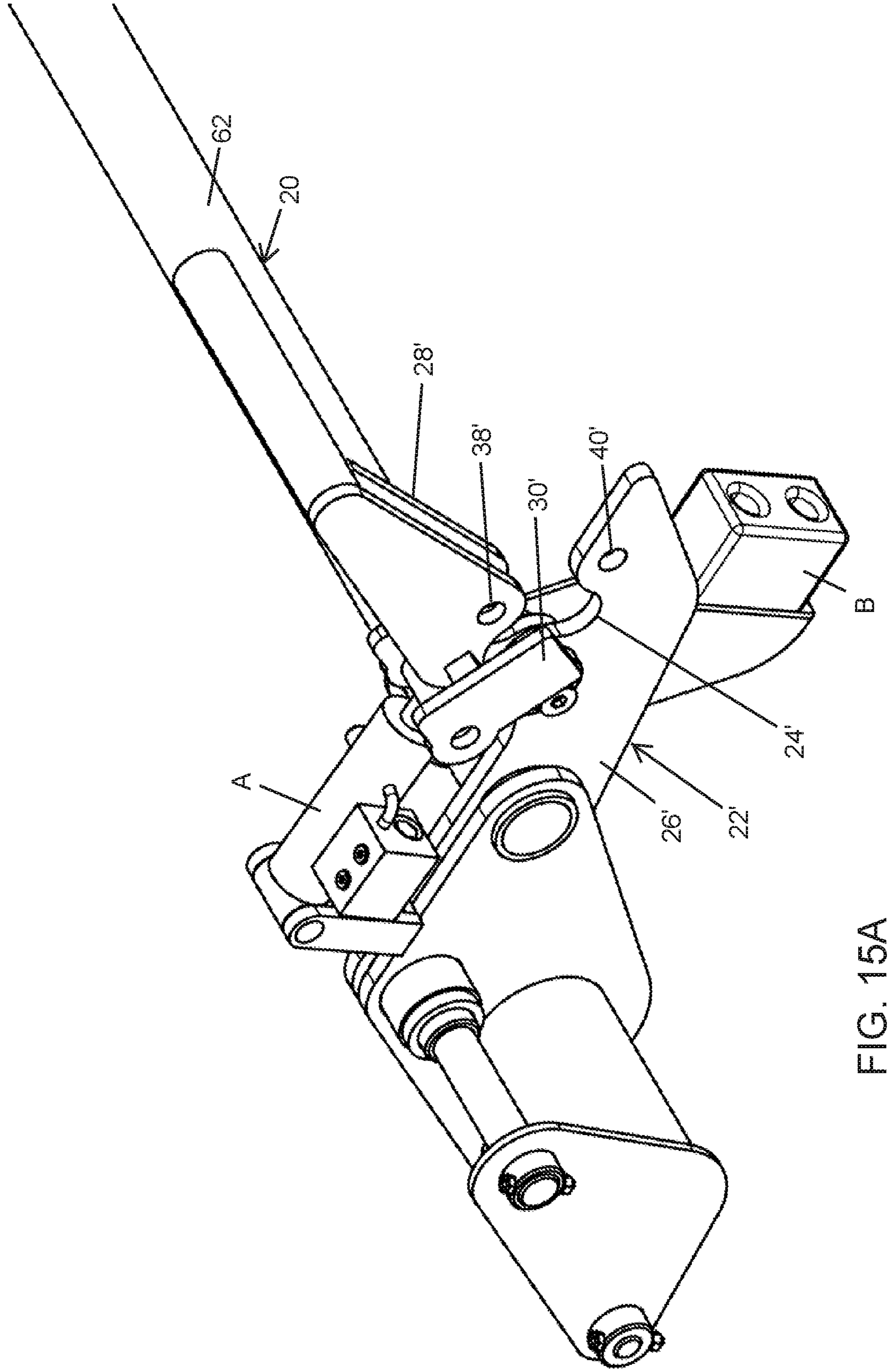
FIG. 15A is an enlarged perspective view of one end of an alternative cross bar assembly including a trunnion bar lock assembly having an actuator and being in the open position.
Figure 15B:
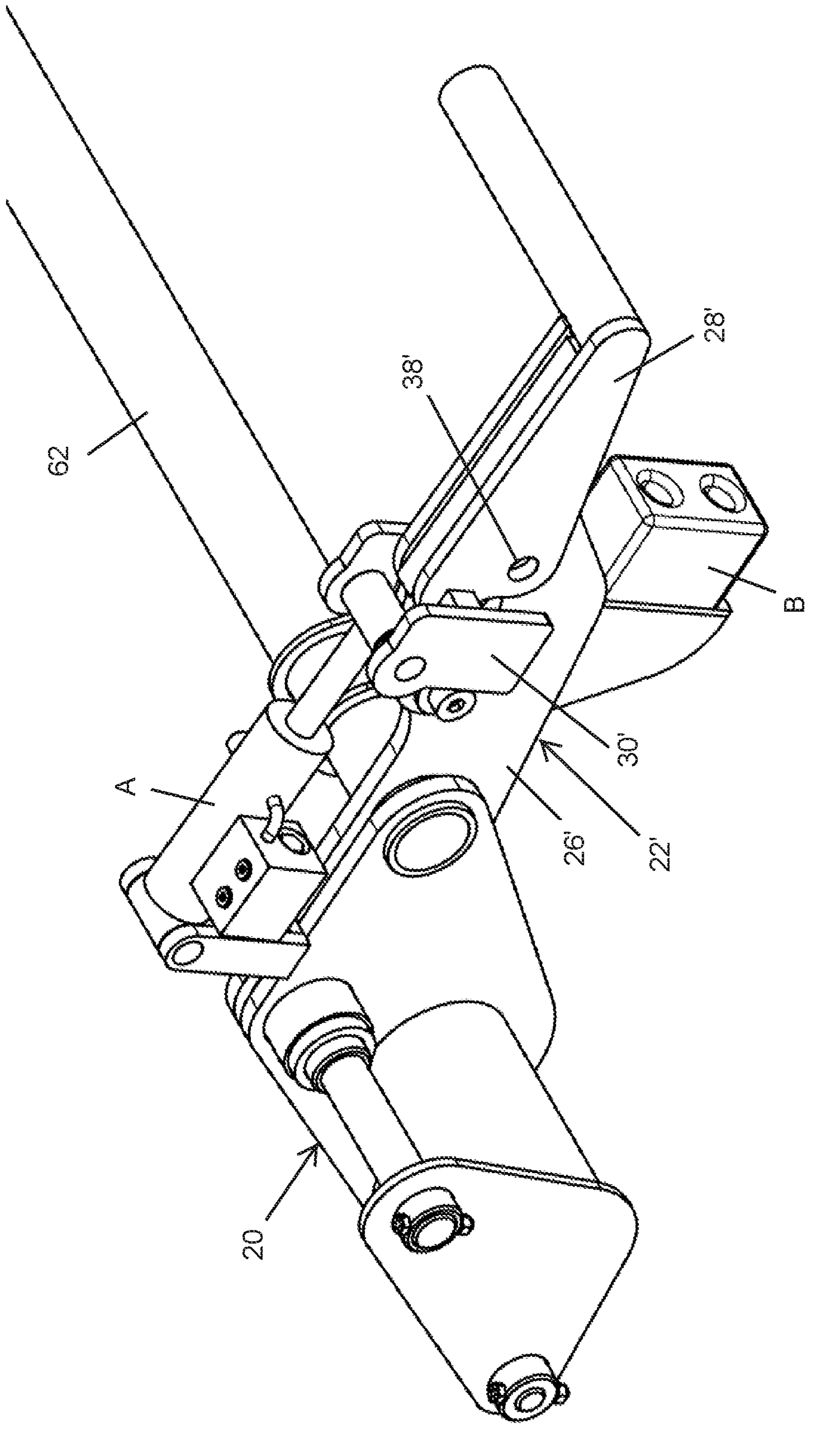
FIG. 15B is an enlarged perspective view of the end of the cross bar assembly shown in FIG. 15A, with the trunnion bar lock assembly moved to a closed position.
Figure 16:
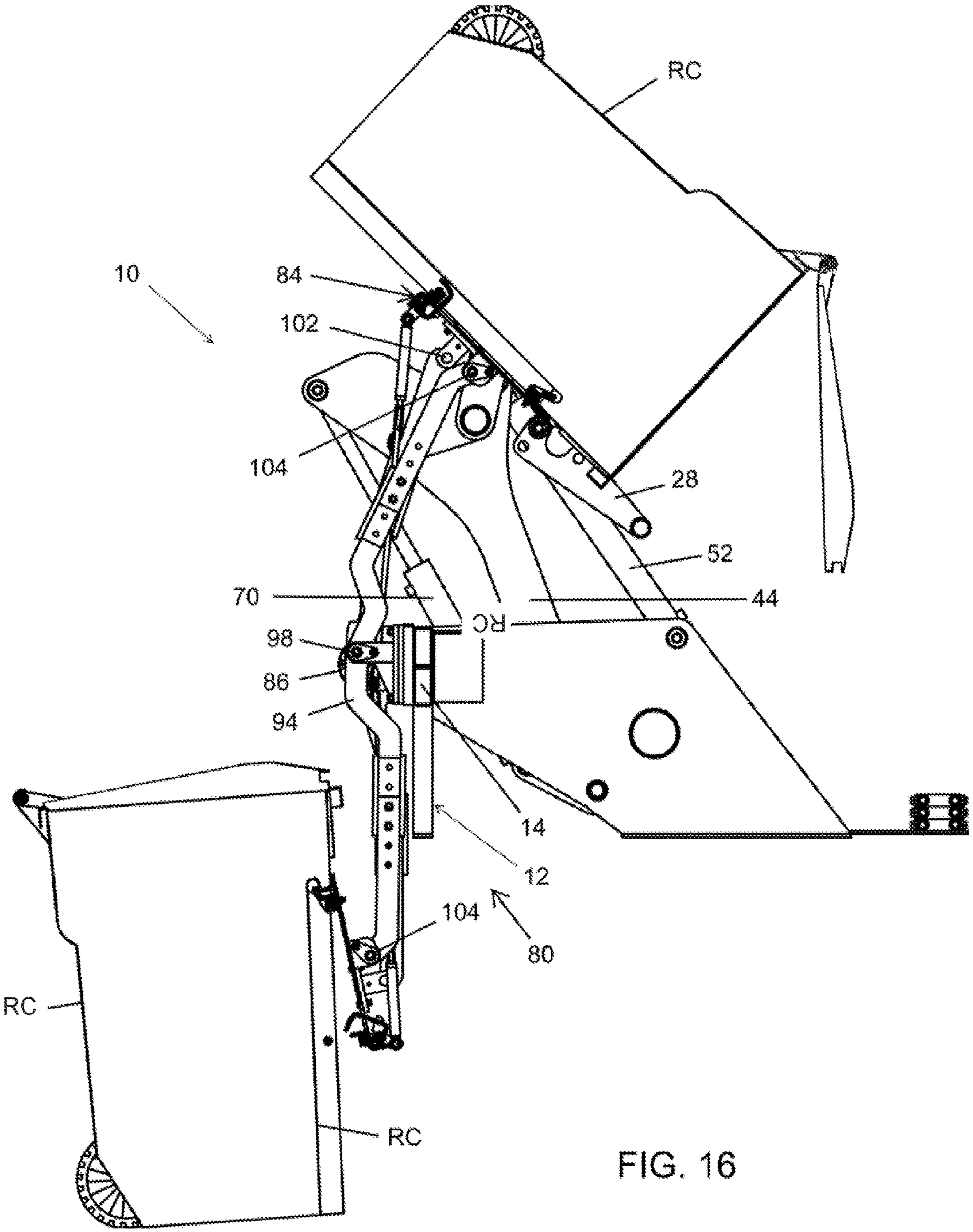
FIG. 16 is a cross sectional side view of the lifter of FIG. 1 with the near portion of the container washer lifter removed and showing the residential refuse collection container lifter in a lower position to pick up a residential refuse collection container, as well as in a raised position to invert the residential refuse collection container for washing, while the commercial refuse collection container lifter is in a raised position.
Figure 17:
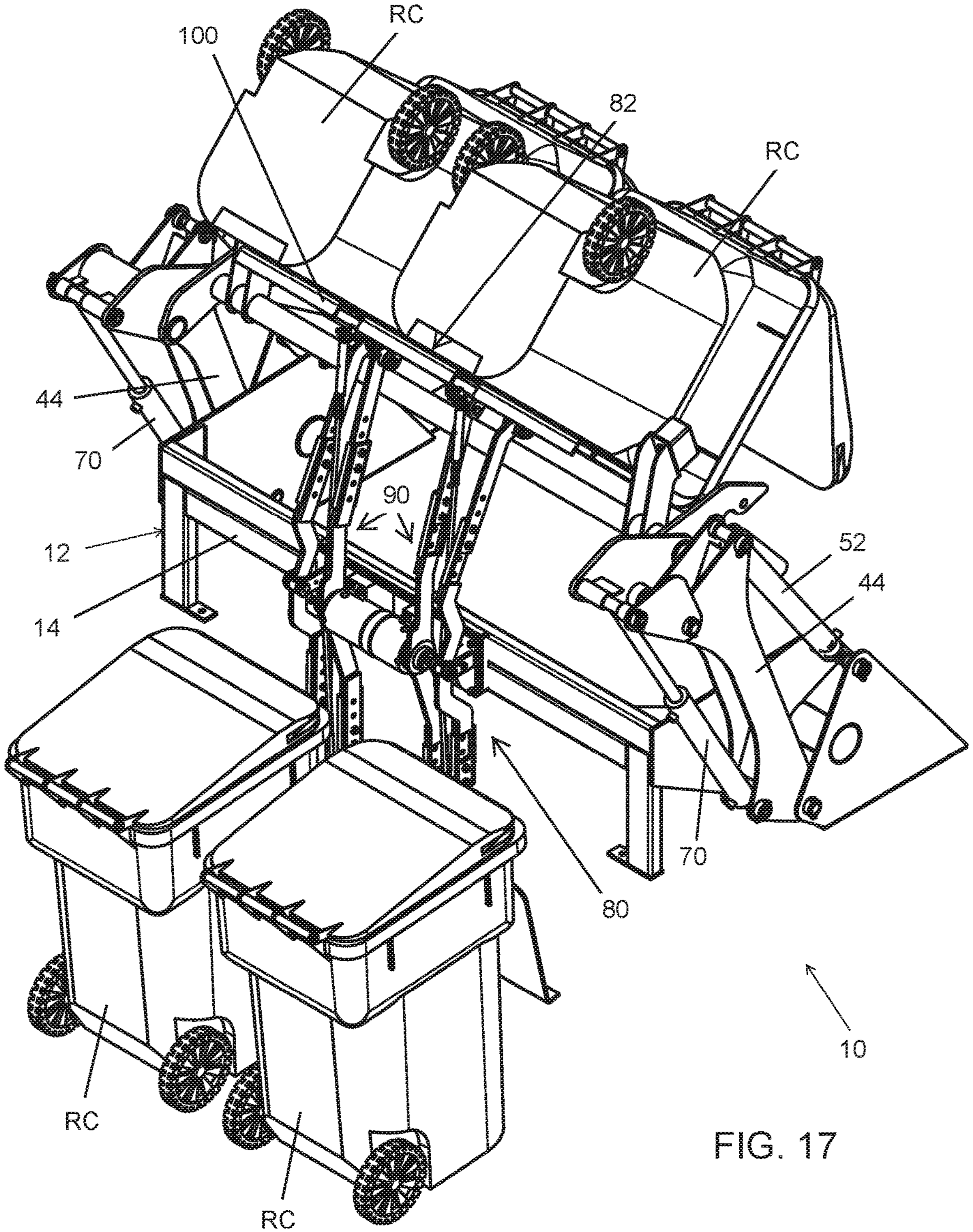
FIG. 17 is a perspective view of the lifter in the positions shown in FIG. 16.

As seen in FIGS. 15A-15B, alternative first and second trunnion bar lock assemblies 22' may include an actuator A for moving a lockdown bar 28' between an open position shown in FIG. 15A and a locked position shown in FIG. 15B. The actuator A may provide sufficient resistance to movement of the lockdown bar 28' in the locked position to hold a trunnion bar in the recess 24' of the rearward extending plate 26'. However, if additional positive resistance to movement is desired, a push pin (not shown) may be used, such as by inserting the push pin into the apertures 38' of the lockdown bar 28' and aperture 40' in the rearward extending plate 26' of the respective trunnion bar lock assembly 22'.

The base 12 of the container washer lifter 10 has first and second side plates 42 connected to the respective first and second ends 16 of the cross member 14. The commercial refuse collection container lifter 18 includes first and second masts 44, with each mast 44 having first and second ends 46, 48. The first ends 46 of the first and second masts 44 are pivotally connected to the respective first and second side plates 42 of the base 12, at pivots 50. The commercial refuse collection container lifter 18 of the container washer lifter 10 further includes first and second lift actuators 52. The lift actuators 52 in this example are linear actuators, which may be hydraulically or electrically driven. Each lift actuator 52 has first and second ends 54, 56. The first ends 54 of the first and second lift actuators 52 are pivotally connected to the respective first and second side plates 42 of the base 12 at locations, such as pivots 58, spaced from the respective connections of the first and second masts 44 to the respective first and second side plates 42 of the base 12. The second ends 56 of the first and second lift actuators 52 are pivotally connected to the second ends 48 of the respective first and second masts 44, at pivots 60.

The cross bar assembly 20 of the container washer lifter 10 includes a cross bar 62. The cross bar assembly 20 also is rotatably connected to the second ends 48 of the respective first and second masts 44, such as at pivots 64.

The commercial refuse collection container lifter 18 includes first and second tilt actuators 70, with each tilt actuator having first and second ends 72, 74. The tilt actuators 70 in this example are linear actuators, which may be hydraulically or electrically driven. The first ends 72 of the tilt actuators 20 are pivotally connected to the respective first ends 46 of the first and second masts 44, at pivots 76. The second ends 74 of the tilt actuators are pivotally connected to the cross bar assembly 20 at locations spaced from the connections of the cross bar assembly 20 to the second ends 48 of the respective first and second masts 44, at pivot 78. In this configuration, the tilt actuators 70 cause pivotal movement of the cross bar assembly 20 relative to the first and second masts 44.

Figure 7:
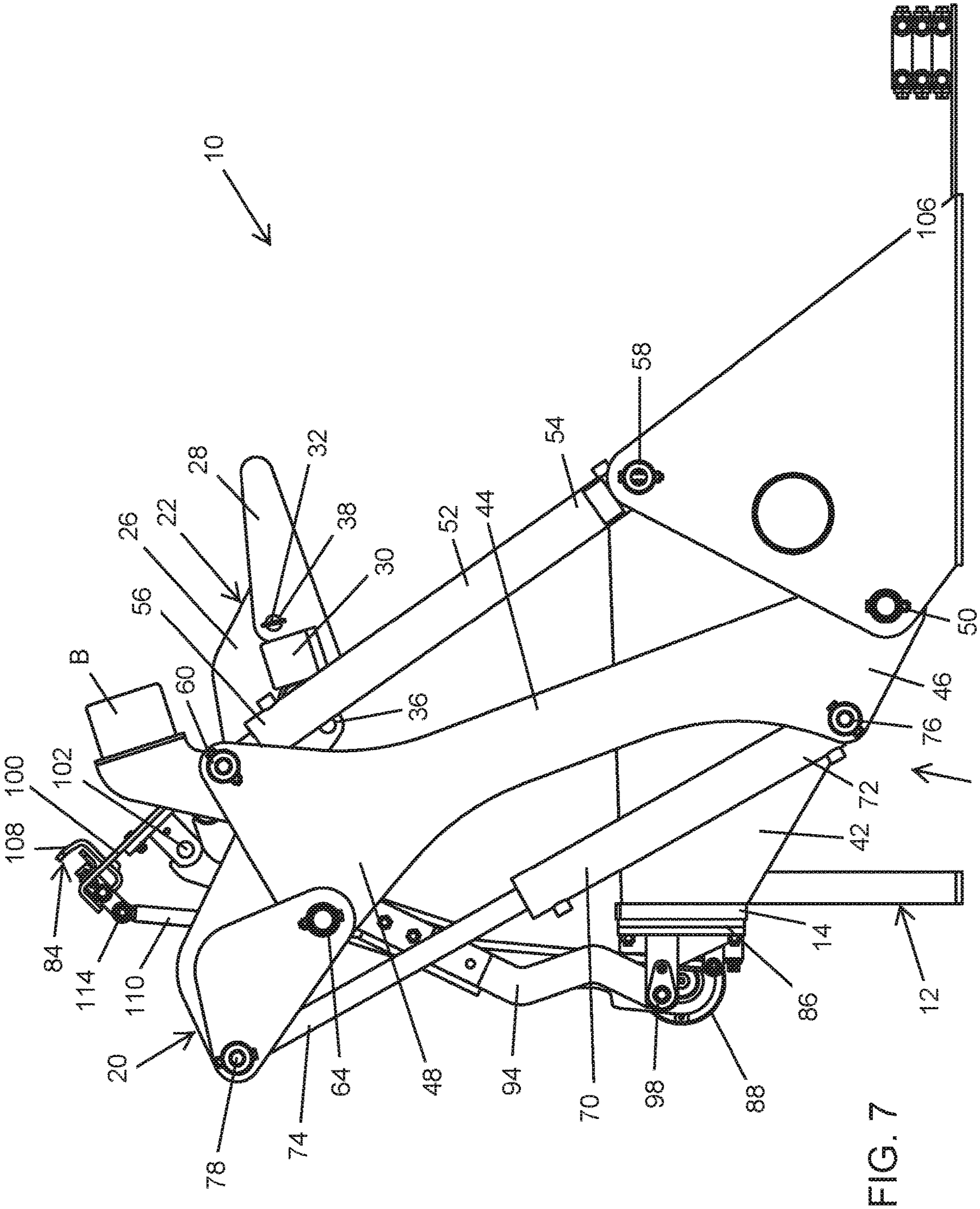
FIG. 7 is a side view of the lifter of FIG. 1 showing the lifter in a fully raised position to invert a commercial refuse collection container for washing, and alternatively to invert at least one residential refuse collection container for washing.

The container washer lifter 10 for a rear load vehicle optionally may further include a residential refuse collection container lifter 80 connected to the cross member 14 between the first and second ends 16 of the cross member 14, as best seen in FIGS. 1-11. The residential refuse collection container lifter 80 includes a residential refuse collection container holding assembly 82 movable between an upright first position below the cross member 14, as seen in FIGS. 1-6, and an inverted second position above the cross member 14, as seen in FIGS. 7-9. The range of motion is shown in FIGS. 10-11.

The holding assembly 82 includes at least one hook assembly 84 that selectively retains at least one handle of a residential refuse collection container RC. The residential refuse collection container lifter 80 may be operated to lift and invert a residential refuse collection container RC when the commercial refuse collection container lifter 18 is in the inverted second position above the cross member 14.

The holding assembly 82 has a bracket 86 connected to the cross member 14, an actuator 88 connected to the bracket 86, first and second lift arm assemblies 90 each having a drive arm 92 and a follower arm 94. The actuator 88 in this example is a rotary actuator, which may be hydraulically or electrically driven. Each drive arm 92 and follower arm 94 has first and second ends. The first end of each respective drive 92 arm is connected to the actuator 88, at secure connection 96. The first end of each follower arm 94 is pivotally connected to the bracket 86, at pivot 98. The second ends of the drive arms 92 and the follower arms 94 are pivotally connected to a lift plate 100, at pivots 102, 104, respectively. The at least one hook assembly 84 also is connected to the lift plate 100.

Figure 18:
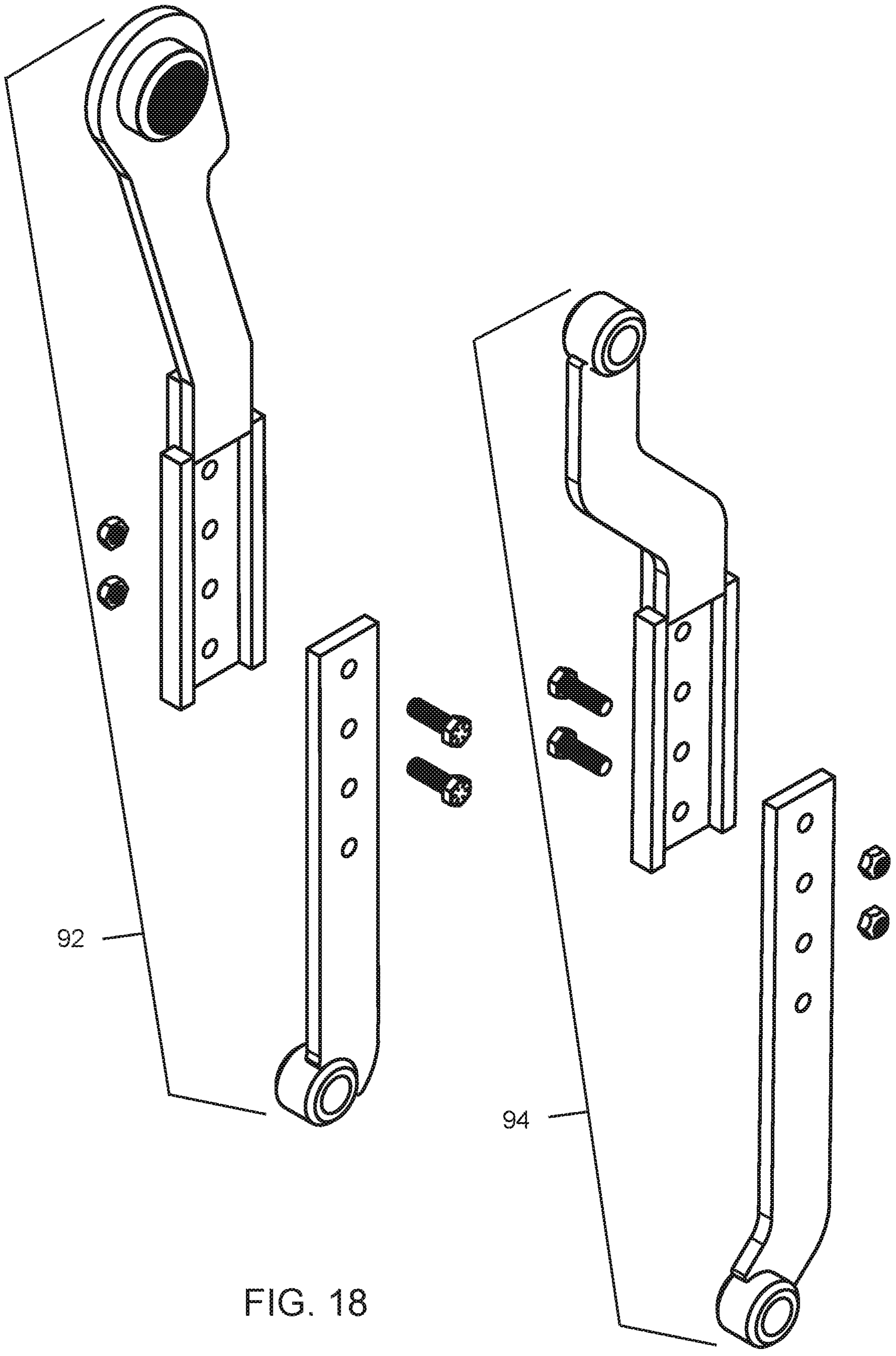
FIG. 18 is an enlarged perspective partially exploded view of one of the first and second drive arms and follower arms of a lift arm assembly, shown with optional fasteners that may be used to adjust the lengths of the respective drive arm and follower arm.

As best seen in FIG. 18, the drive arms 92 and follower arms 94 may be constructed to have adjustable respective lengths, such as by having first and second portions and multiple apertures in each, along with fasteners to secure together the first and second portions. Adjustable lengths may help to accommodate use on vehicles having different chassis heights and/or residential containers of different sizes or having different lengths between upper and lower grasping structures.

Figure 3:
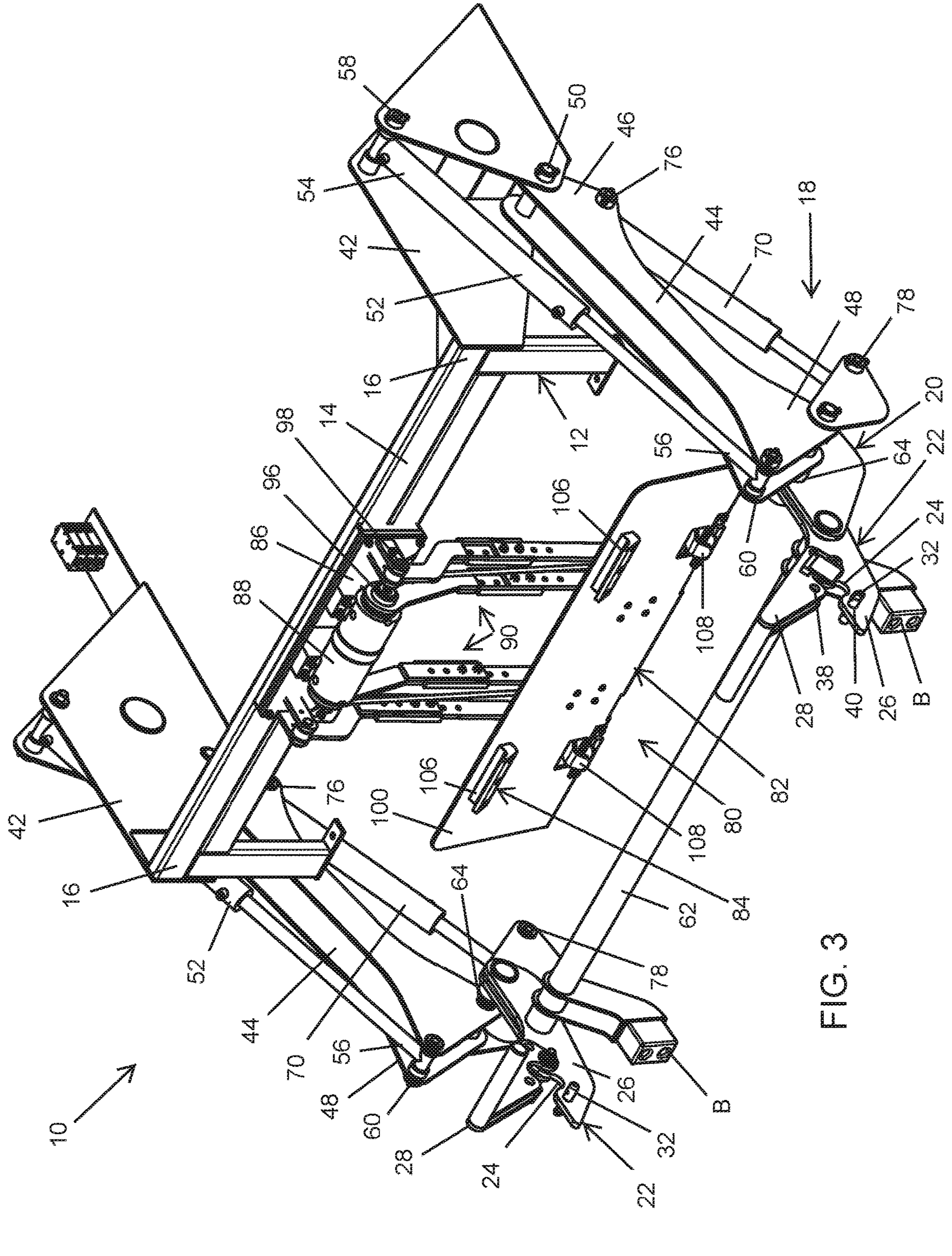
FIG. 3 is a perspective view of the lifter in the position shown in FIG. 1.
Figure 4:
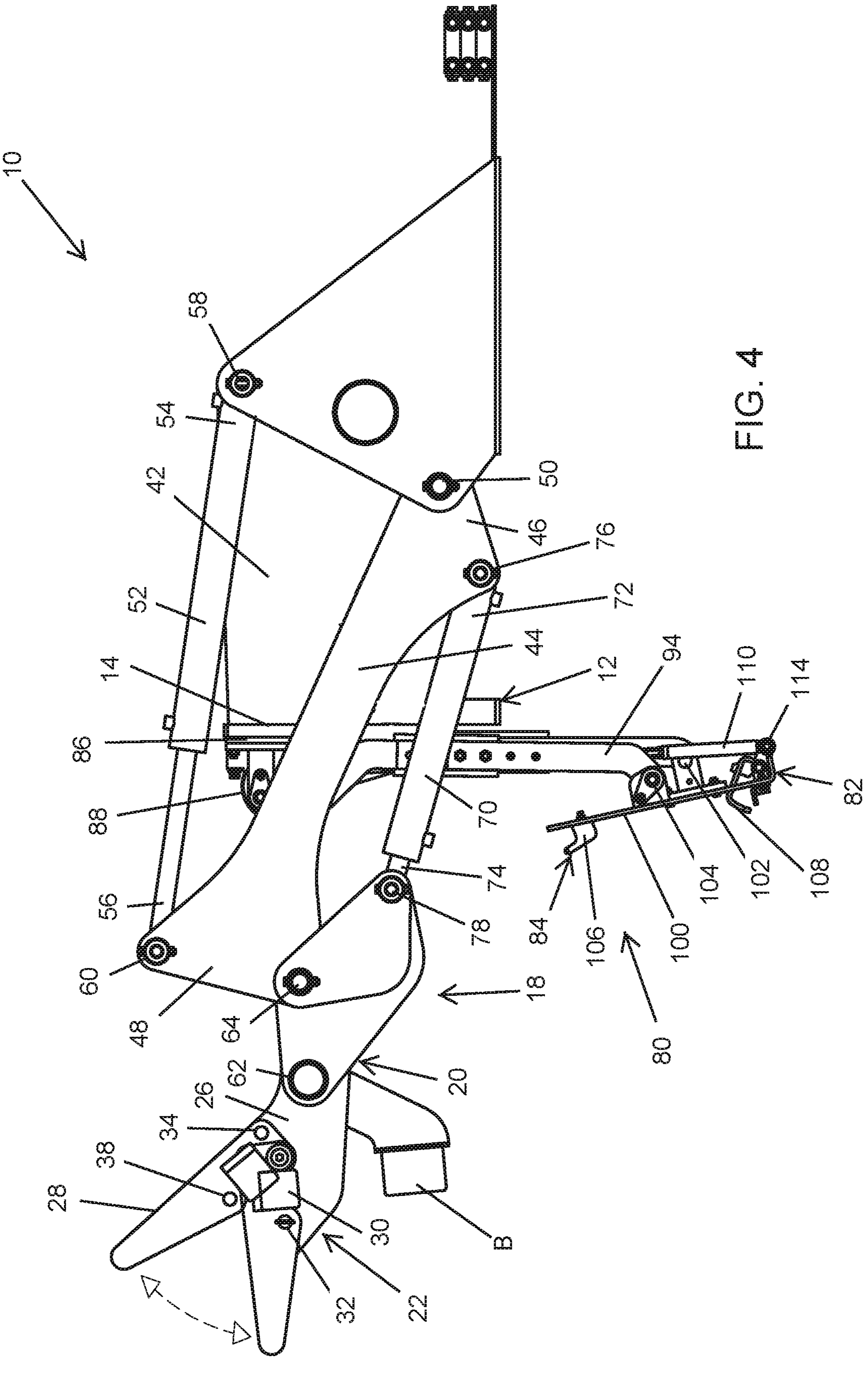
FIG. 4 is a side view of the lifter of FIG. 1 showing a range of motion for the trunnion lock assembly when the lifter is in a position to engage a commercial container.
Figure 5:
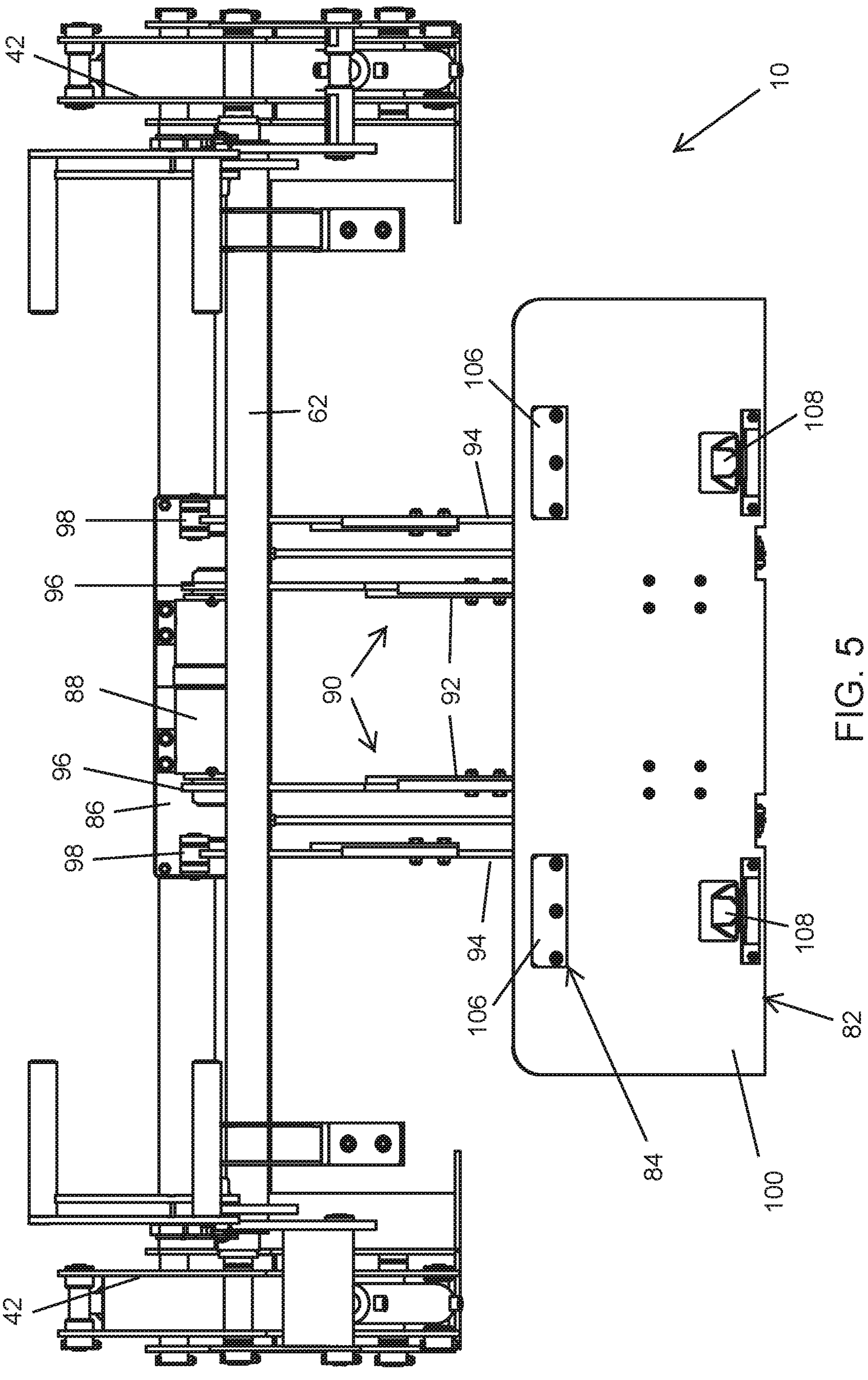
FIG. 5 is a front view of the lifter in the position shown in FIG. 4.
Figure 6:
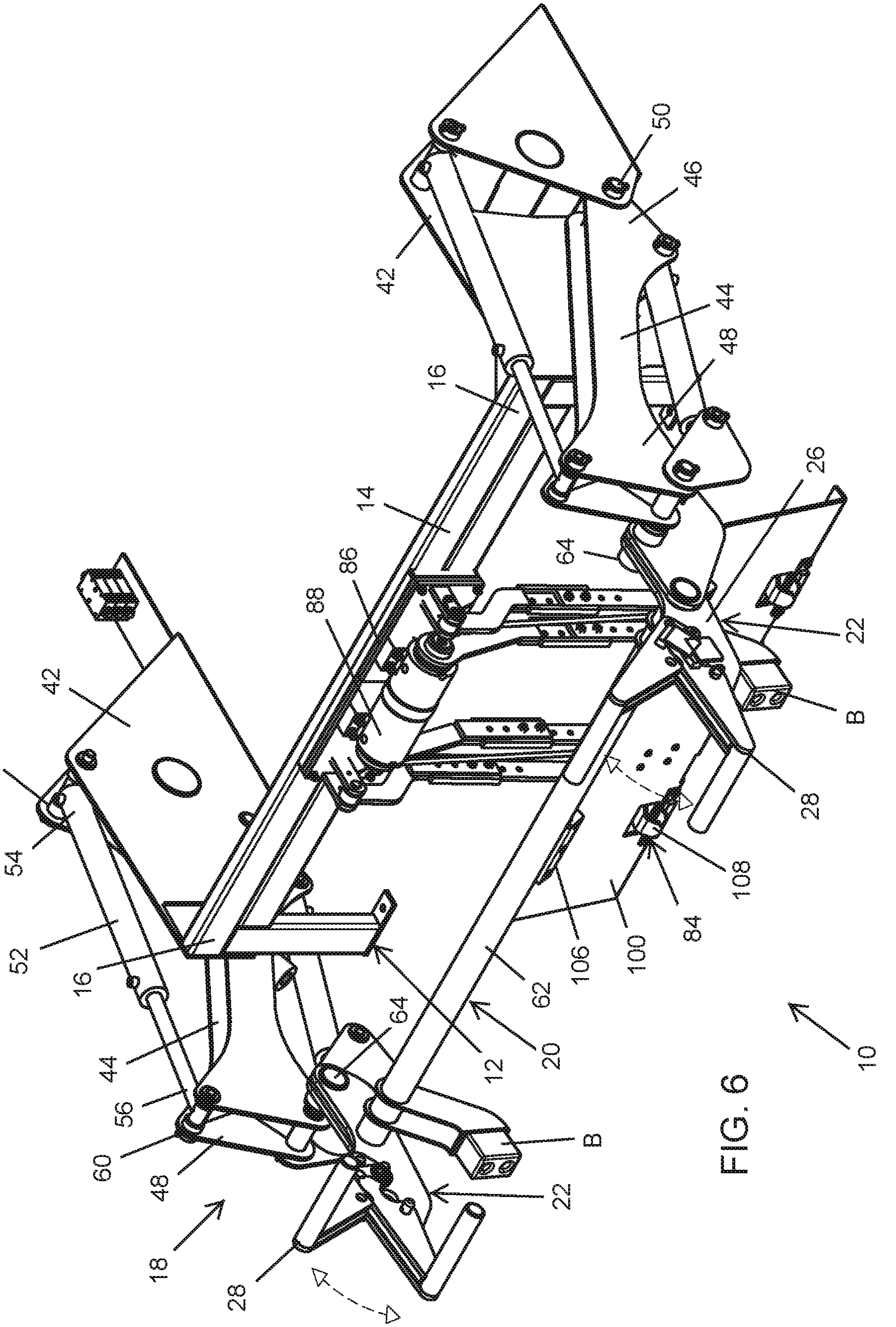
FIG. 6 is a perspective view of the lifter in the position shown in FIG. 4.

As seen, for example, in FIGS. 3 and 4, the hook assembly 84 of the residential refuse collection container lifter 80 may include at least one upper hook 106 and at least one lower hook 108. The least one upper hook 106 may be fixedly connected to the lift plate 100. The at least one lower hook 108 may be pivotally connected to the lift plate 100. In the present example, the hook assembly 84 includes at least one hook pivot rod 110 having first and second ends, with the first end of the at least one hook pivot rod 110 pivotally connected to the bracket 86, such as at pivot 112, and the second end of the at least hook pivot rod 110 pivotally connected to the at least one lower hook 108, such as at pivot 114.

It will be appreciated that when the actuator 88 moves the first and second drive arms 92 to raise the lift plate 100 of the residential refuse collection container lifter 80, the at least one upper hook 106 is positioned to support an upper handle of the residential refuse collection container RC and the pivot rod 110 pivots the at least one lower hook 108 to grasp the residential refuse collection container RC. This is facilitated by the residential refuse collection containers RC typically having upper and lower handles.

The present example provides an advantageous residential refuse collection container lifter 80 wherein the hook assembly 84 includes two upper hooks 106 and two lower hooks 108. This permits increased efficiency and productivity relative to a lifter having a single hook assembly. Thus, if equipped with this advantageous configuration, an operator may lift and invert twice as many residential refuse collection containers RC in roughly the same amount of time. In the dual container configuration, the two upper hooks 106 are spaced apart and fixedly connected to the lift plate 100, and the two lower hooks 108 are spaced apart and pivotally connected to the lift plate 100. To provide actuation, the hook assembly 84 further includes two hook pivot rods 110 having first and second ends, with the first ends of the two respective hook pivot rods 110 spaced apart and pivotally connected to the bracket, such as at pivots 112, and the second ends of the two respective hook pivot rods 110 spaced apart and pivotally connected to the two lower hooks 108, such as at pivots 114.

As shown with container washer lifter 10, the residential refuse collection container lifter 80 and the commercial refuse container lifter 18 are configured to avoid interference with each other. In the present example, while the commercial refuse container lifter 18 may be operated without moving the residential refuse collection container lifter 80, the commercial refuse collection container lifter 18 must be in an upper position to accommodate the full range of motion of the residential refuse collection container lifter 80.

Figure 1:
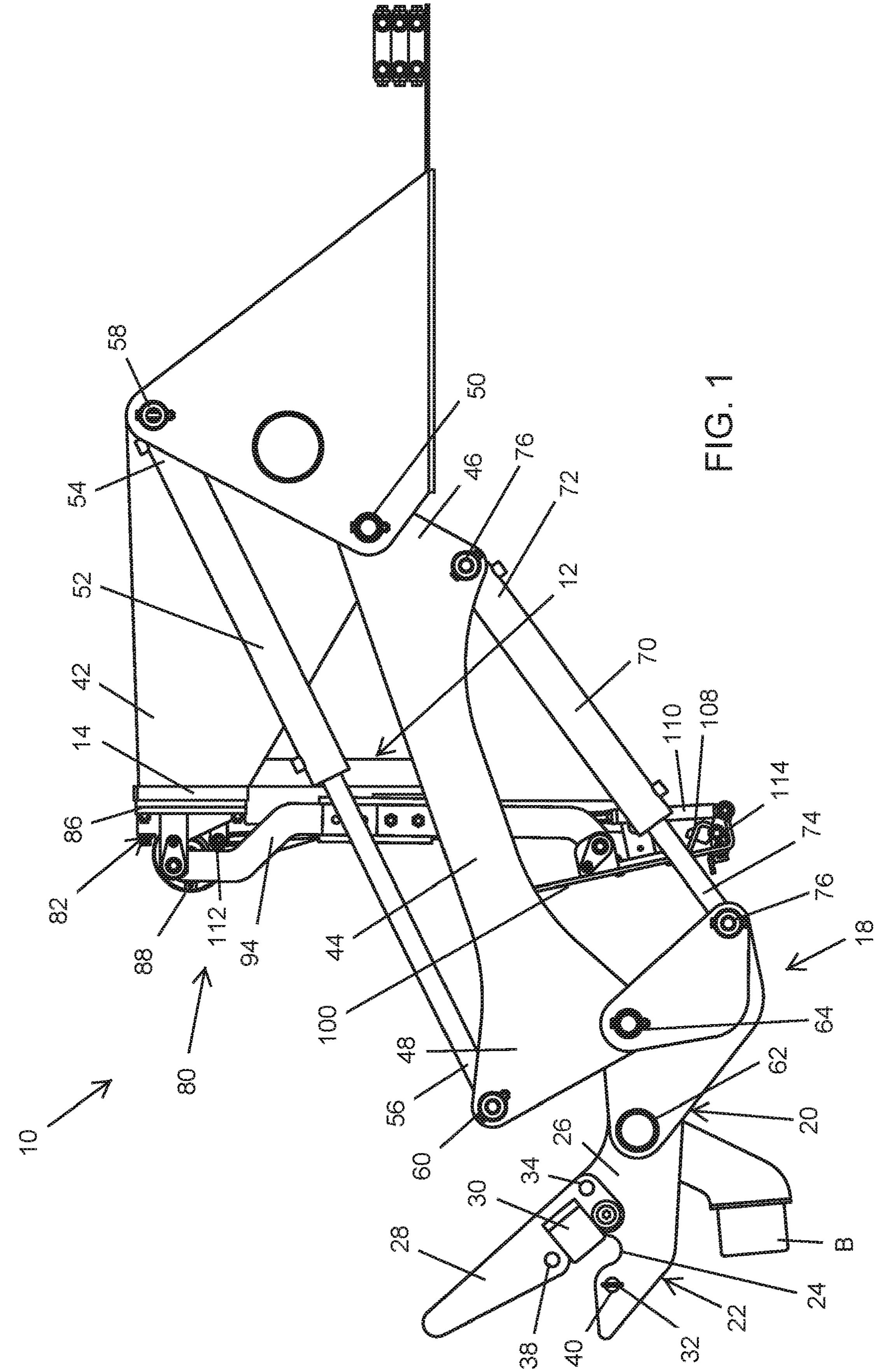
FIG. 1 is a side view of a container washer lifter for a rear load vehicle, configured for lifting a commercial refuse collection container having a trunnion bar, as well as for alternatively lifting one or more relatively smaller residential refuse collection containers.
Figure 2:
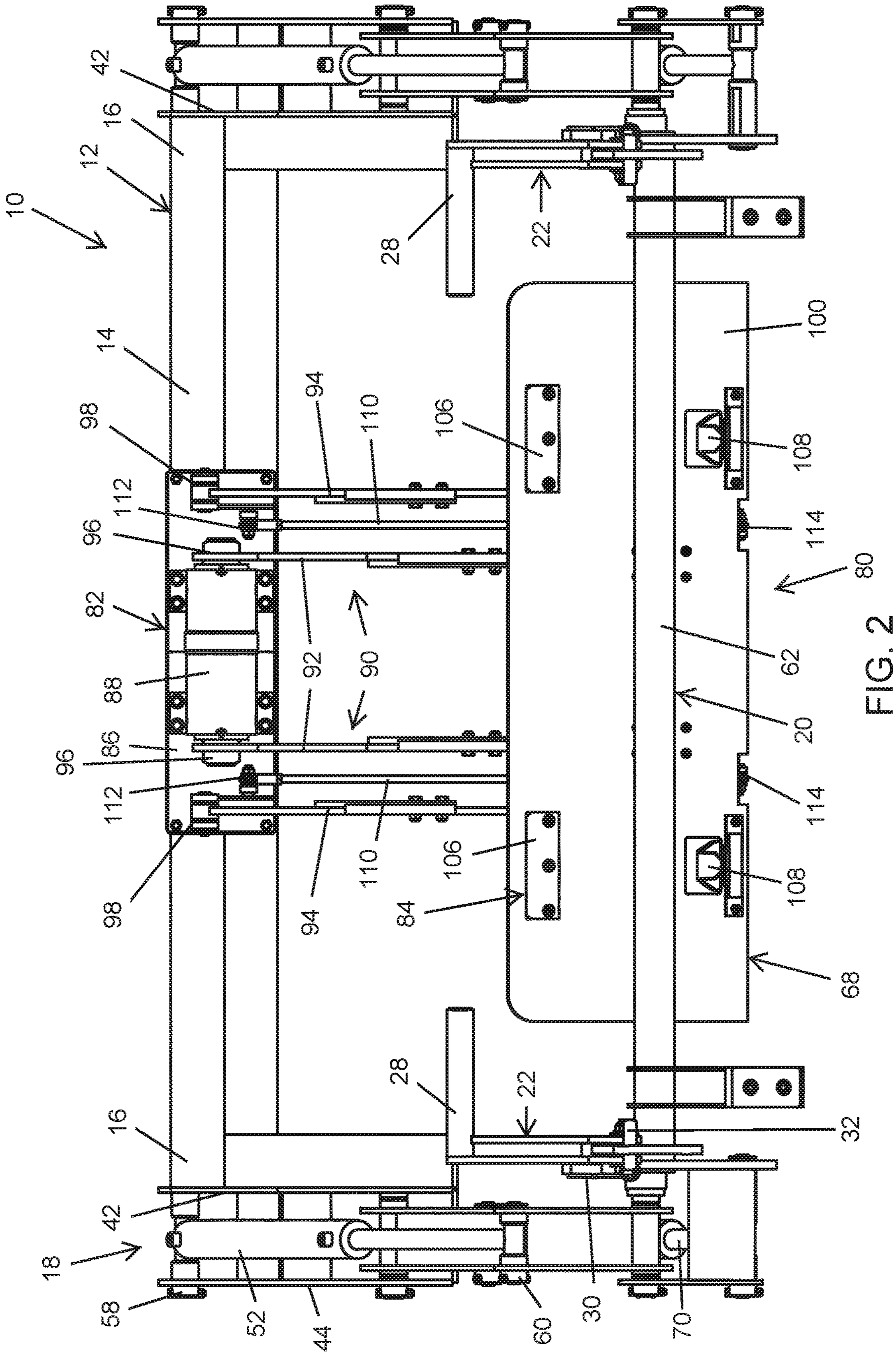
FIG. 2 is a front view of the lifter in the position shown in FIG. 1.
Figure 19:
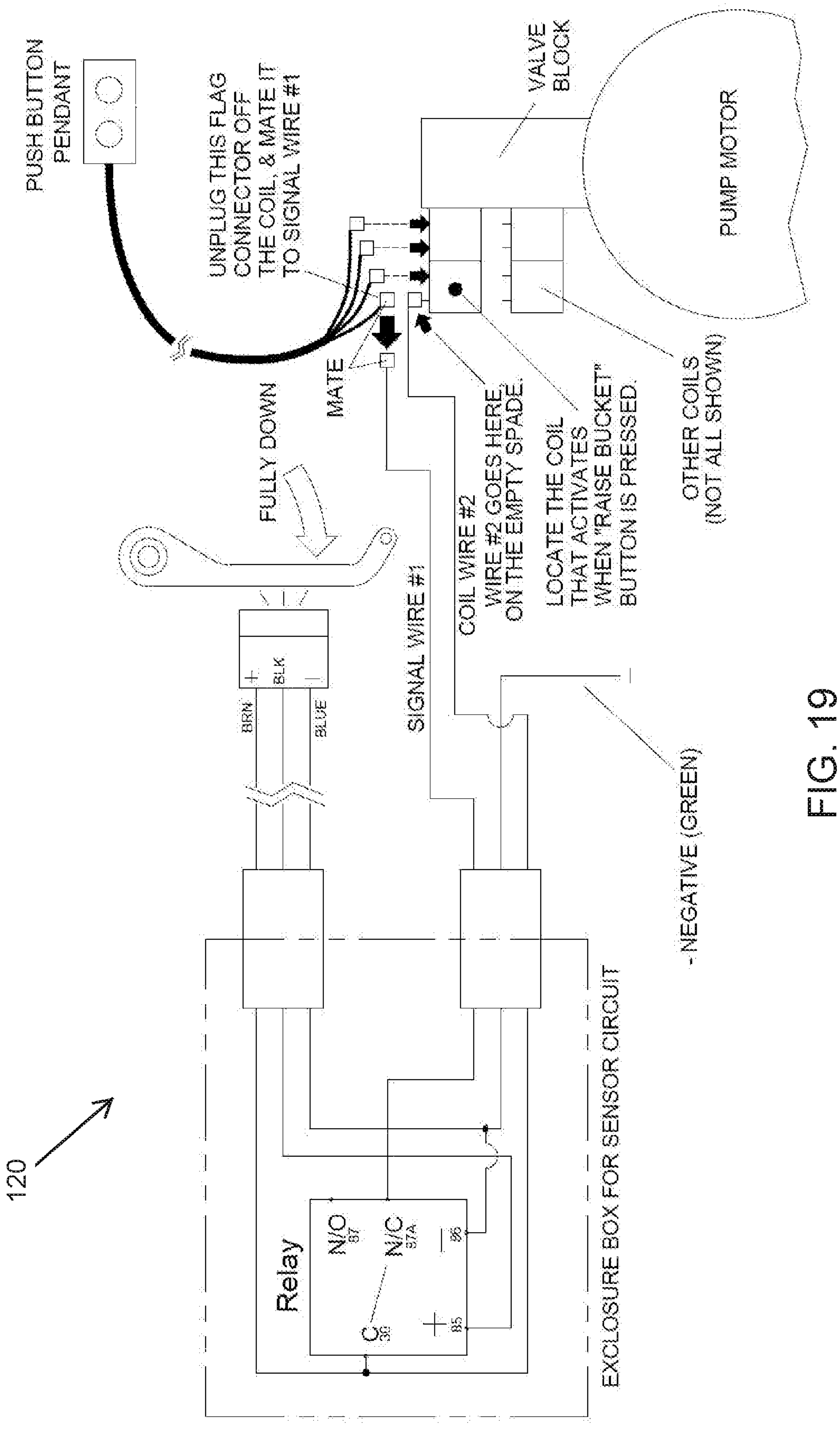
FIG. 19 shows a control system circuit that may provide beneficial operation of the lifter shown in FIG. 1.

Finally, FIG. 19 shows an optional control system circuit 120 that may provide additional benefits during operation of the container washer lifter 10 shown in FIG. 1. The circuit in FIG. 19 essentially is intended to assist in preventing operator error. The circuit 120 may be configured with a sensor for monitoring the position of the commercial refuse collection container lifter 18 and the residential refuse collection container lifter 80 relative to the position of the hold down bars 28 of the commercial refuse collection container lifter 18. Use of sensors assist in ensuring that no portion of the lifter 10 may be raised unless the lock down bars 28 are confirmed to be in a locked position. The circuit also may be configured with a sensor to prevent the residential refuse collection container lifter 80 from being raised, unless the masts 44 of the commercial refuse collection container lifter 18 are already in a fully raised position. Such use of a control circuit 120 help to avoid interference of the components within the container washer lifter 10. The extent or additional features added to such circuit 120 are optional, based on the desired level of automation, because many of the functions of the apparatus may be operated based on manual inputs from an operator. For example, an operator may move the lock down bars 28 manually and manually move the push pins 32 to lock components in particular positions, or such functions may be achieved via actuators A, or by other suitable means of movement or actuation.

It will be appreciated that a container washer lifter has been provided that may be used for washing relatively larger commercial refuse collection containers only or additionally for washing relatively smaller residential refuse collection containers. While the container washer lifter has been described in terms of one or more preferred embodiments, the invention should not be limited to these specific examples, but rather includes apparatus that would be within the scope of the following claims.

The invention claimed is:

1. A container washer lifter for a rear load vehicle comprising: a base having a cross member having first and second ends; and a commercial refuse collection container lifter connected to the cross member and comprising a cross bar assembly movable between an upright first position rearward of and below the cross member and an inverted second position above the cross member, with the cross bar assembly further comprising first and second trunnion bar lock assemblies that selectively retain a trunnion bar of a commercial refuse collection container.

2. The container washer lifter of claim 1, wherein each of the first and second trunnion bar lock assemblies further comprises an open position to receive or release a trunnion bar and a locked position to retain a trunnion bar.

3. The container washer lifter of claim 2, wherein each trunnion bar lock assembly further comprises a trunnion bar recess that receives a trunnion bar.

4. The container washer lifter of claim 2, wherein each trunnion bar lock assembly further comprises a lockdown bar that selectively connects the trunnion bar to the trunnion bar lock assembly.

5. The container washer lifter of claim 4, wherein each trunnion bar lock assembly further comprises a trunnion bar recess that receives a trunnion bar and the lockdown bar is pivotally movable relative to the trunnion bar recess.

6. The container washer lifter of claim 4, wherein each trunnion bar lock assembly further comprises a lateral lock plate that blocks outward lateral movement of the trunnion bar when the trunnion bar is received by the trunnion bar lock assembly and the lockdown bar is moved to the locked position.

7. The container washer lifter of claim 2, wherein each of the first and second trunnion bar lock assemblies further comprises a push pin for holding a lockdown bar in the open position or the locked position.

8. The container washer lifter of claim 2, wherein each of the first and second trunnion bar lock assemblies further comprises an actuator for moving a lockdown bar between the open position and the locked position.

9. The container washer lifter of claim 1, wherein the base further comprises first and second side plates connected to the respective first and second ends of the cross member.

10. The container washer lifter of claim 9, wherein the commercial refuse collection container lifter further comprises first and second masts, with each mast having first and second ends, the first ends of the first and second masts pivotally connected to the respective first and second side plates of the base.

11. The container washer lifter of claim 10, wherein the commercial refuse collection container lifter further comprises first and second lift actuators, with each lift actuator having first and second ends, with the first ends of the first and second lift actuators pivotally connected to the respective first and second side plates of the base at locations spaced from the respective connections of the first and second masts to the respective first and second side plates of the base, and with the second ends of the first and second lift actuators pivotally connected to the second ends of the respective first and second masts.

12. The container washer lifter of claim 11, wherein the cross bar assembly further comprises a cross bar and the cross bar assembly is rotatably connected to the second ends of the respective first and second masts.

13. The container washer lifter of claim 12, wherein the commercial refuse collection container lifter further comprises first and second tilt actuators, with each tilt actuator having first and second ends, with the first ends of the tilt actuators pivotally connected to the respective first ends of the first and second masts and the second ends of the tilt actuators pivotally connected to the cross bar assembly at locations spaced from the connections of the cross bar assembly to the second ends of the respective first and second masts, and with the tilt actuators causing pivotal movement of the cross bar assembly relative to the first and second masts.

14. The container washer lifter of claim 1, further comprising a residential refuse collection container lifter connected to the cross member between the first and second ends of the cross member and comprising a residential refuse collection container holding assembly movable between an upright first position below the cross member and an inverted second position above the cross member, with the holding assembly further comprising at least one hook assembly that selectively retains at least one handle of a residential refuse collection container.

15. The container washer lifter of claim 14, wherein the residential refuse collection container lifter may be operated to lift and invert a residential refuse collection container when the commercial refuse collection container lifter is in the inverted second position above the cross member.

16. The container washer lifter of claim 14, wherein the residential refuse collection container holding assembly further comprises a bracket connected to the cross member, an actuator connected to the bracket, first and second lift arm assemblies each having a drive arm and a follower arm, with each drive arm and follower arm having first and second ends, the first end of each respective drive arm connected to the actuator, the first end of each follower arm pivotally connected to the bracket, and the second ends of the drive arms and the follower arms pivotally connected to a lift plate, and the at least one hook assembly connected to the lift plate.

17. The container washer lifter of claim 16, wherein the drive arms and follower arms have adjustable respective lengths.

18. The container washer lifter of claim 17, wherein the hook assembly further comprises at least one upper hook and at least one lower hook.

19. The container washer lifter of claim 18, wherein the at least one upper hook is fixedly connected to the lift plate.

20. The container washer lifter of claim 19, wherein the at least one lower hook is pivotally connected to the lift plate.

21. The container washer lifter of claim 20, wherein the hook assembly further comprises at least one hook pivot rod having first and second ends, with the first end of the at least one hook pivot rod pivotally connected to the bracket and the second end of the at least hook pivot rod pivotally connected to the at least one lower hook.

22. The container washer lifter of claim 21, wherein when the actuator moves the first and second drive arms to raise the lift plate of the residential refuse collection container lifter, the at least one upper hook is positioned to support an upper handle of the residential refuse collection container and the pivot rod pivots the at least one lower hook to grasp the residential refuse collection container.

23. The container washer lifter of claim 22, wherein the hook assembly further comprises two upper hooks and two lower hooks.

24. The container washer lifter of claim 23, wherein the two upper hooks are spaced apart and fixedly connected to the lift plate, and the two lower hooks are spaced apart and pivotally connected to the lift plate.

25. The container washer lifter of claim 23, wherein the hook assembly further comprises two hook pivot rods having first and second ends, with the first ends of the two respective hook pivot rods spaced apart and pivotally connected to the bracket and the second ends of the two respective hook pivot rods spaced apart and pivotally connected to the two lower hooks.

* * * * *